United States Patent [19]
Yuan

[11] 3,900,662
[45] *Aug. 19, 1975

[54] BONDABLE ADHESIVE COATED POLYIMIDE FILM AND LAMINATES

[75] Inventor: Edward L. Yuan, Philadelphia, Pa.

[73] Assignee: E. I. Du Pont de Nemours and Company, Wilmington, Del.

[ * ] Notice: The portion of the term of this patent subsequent to July 2, 1991, has been disclaimed.

[22] Filed: Jan. 17, 1973

[21] Appl. No.: 324,493

[52] U.S. Cl. .............. 428/252; 428/287; 428/458; 428/463; 428/483; 428/507; 428/510; 428/514; 428/355; 260/844; 260/856

[51] Int. Cl. ........................................... B32b 27/04

[58] Field of Search .. 117/138, 8 N, 8 VA, 161 UT; 161/88, 92, 93, 214, 227, 229

[56] References Cited
UNITED STATES PATENTS

| | | | |
|---|---|---|---|
| 2,787,603 | 4/1957 | Sanders | 117/232 |
| 3,032,521 | 5/1962 | Sanderson | 117/161 UT |
| 3,179,634 | 4/1965 | Edwards | 117/138.8 N |
| 3,386,939 | 6/1968 | Mesec | 117/161 UT |
| 3,492,270 | 1/1970 | Parish | 117/138.8 N |
| 3,502,762 | 3/1970 | Haller | 117/138.8 N |
| 3,598,770 | 8/1971 | Moore et al. | 117/161 UT |
| 3,681,069 | 8/1972 | McNamee et al. | 117/161 UT |
| 3,713,868 | 1/1973 | Gordon | 117/161 UT |
| 3,717,543 | 2/1973 | Sinclair et al. | 161/186 |
| 3,822,175 | 7/1974 | Yuan | 161/93 |

*Primary Examiner*—George F. Lesmes
*Assistant Examiner*—William R. Dixon, Jr.

[57] ABSTRACT

Polyimide film coated with an acrylic adhesive and laminate articles made therefrom.

15 Claims, No Drawings

BONDABLE ADHESIVE COATED POLYIMIDE FILM AND LAMINATES

BACKGROUND OF THE INVENTION

This invention relates to polyimide film coated with acrylic adhesive.

SUMMARY OF THE INVENTION

According to the present invention, there is provided:

An acrylic adhesive coated polyimide film, said polyimide film having the recurring unit:

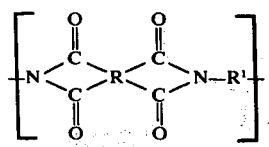

wherein R is a tetravalent radical containing at least one ring of six carbon atoms, said ring characterized by benzenoid unsaturation, the four carbonyl groups being attached directly to separate carbon atoms in the ring of the R radical and each pair of carbonyl groups being attached to adjacent carbon atoms in the ring of the R radical; and wherein $R^1$ is a divalent radical containing at least two rings of six carbon atoms, each ring characterized by benzenoid unsaturation, and in which no more than one of the valence bonds is located on any one of said rings of said $R^1$ radical;

said acrylic adhesive being a terpolymer having 15–65% by weight of the terpolymer of acrylonitrile, methacrylonitrile, or mixtures thereof, 30–84% by weight of the terpolymer of butyl acrylate, ethyl acrylate, 2-ethylhexyl acrylate, lauryl acrylate, or mixtures thereof, and 1–15% by weight of the terpolymer of methacrylic acid, acrylic acid, itaconic acid, or mixtures thereof, said acrylic adhesive also containing a cross-linking resin selected from the group consisting of phenol formaldehyde, melamine formaldehyde and hexamethoxymethyl melamine, said resin being present in an amount of about 1–10% by weight of the terpolymer.

There is also provided by this invention, laminates made from the foregoing acrylic adhesive coated polyimide film. Such laminates are made by adhering the acrylic adhesive coated polyimide film to suitable substrates, such as metal foils and the like.

DESCRIPTION OF THE INVENTION

Polyimides suitable for use as films in this invention are disclosed in Edwards U.S. Pat. No. 3,179,634, issued Apr. 20, 1965, the disclosure of which is hereby incorporated by reference. These polyimides are characterized by the following recurring structural formulas:

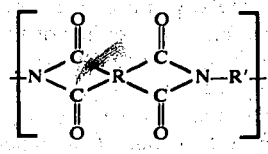

where R is a tetravalent aromatic radical, preferably containing at least one ring of six carbon atoms, said ring characterized by benzenoid unsaturation, the four carboxyl groups being attached directly to separate carbon atoms in a ring and each pair of carbonyl groups being attached to adjacent carbon atoms in a ring of the R radical; and where R' is a divalent benzenoid radical selected from the group consisting of

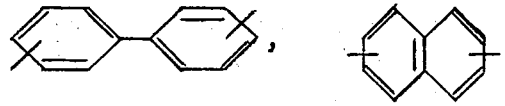

and

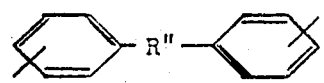

where R'' is selected from the group consisting of an alkylene chain having 1–3 carbon atoms,

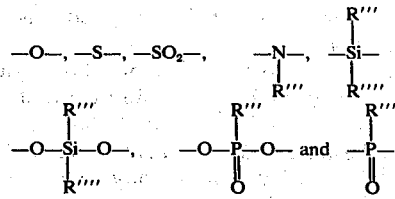

where R''' and R'''' are selected from the group consisting of alkyl and aryl.

These polyimides have outstanding physical and chemical properties which madke them very useful as shaped structures such as self-supporting films and the like. The structures are characterized by high tensile properties, desirable electric properties and surprising stability to heat and water.

The polyimides are prepared by reacting at least one organic diamine having the structural formula $$H_2N - R' - NH_2$$

wherein R' is a divalent benzenoid radical selected from the group consisting of

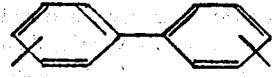

and 

wherein R'' is selected from the group consisting of an alkylene chain having 1-3 carbon atoms,

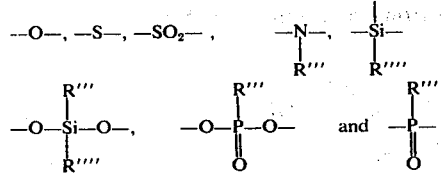

wherein R''' and R'''' are selected from the group consisting of alkyl and aryl, with at least one tetracarboxylic acid dianhydride having the structural formula

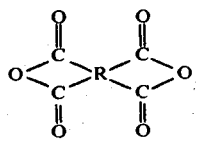

wherein R is a tetravalent aromatic organic radical, preferably containing at least one ring of six carbon atoms, said ring characterized by benzenoid unsaturation, the four carbonyl groups being attached directly to separate carbon atoms in a ring and carbon atoms of each pair of carbonyl groups being attached to adjacent carbon atoms in a ring of the radical.

The diamine and the dianhydride may be reacted directly. Alternatively, the dianhydride may first be reacted with a mono-functional alcohol (ethanol) to form a monomeric diester-diacid which is then reacted with the diamine. As a third alternative, any combination of the foregoing two techniques may be used. In all of these techniques melt polymerization is performed under such conditions to form the polyimide directly.

The starting materials for forming these polyimides are specific organic diamines and tetracarboxylic acid dianhydrides. The organic diamines are characterized by the formula $H_2NR'—NH_2$ wherein R' is a divalent benzenoid radical selected from the group consisting of

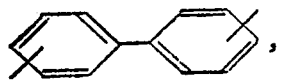, 

and

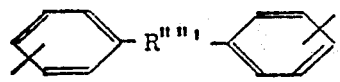

wherein R''''' is a divalent isoelectronic configuration comprising elements from Rows IVa, Va and VIa of the Periodic Table having an atomic weight of 12-33. Among the diamines which are suitable for use in the present invention are:

4,4'-diaminodiphenyl propane,
4,4'-diamino-diphenyl methane, benzidine,
3,3'-dichlorobenzidine, 4,4'-diamino-diphenyl sulfide,
3,3'-diaminodiphenyl sulfone,
4,4'-diamino-diphenyl sulfone,
4,4'-diamino-diphenyl ether,
1,5-diamino naphthalene,
4,4'-diamino-diphenyl diethylsilane,
4,4'-diamino-diphenyl diphenylsilane,
4,4'-diamino-diphenyl ethyl phosphine oxide,
4,4'-diamino-diphenyl phenyl phosphine oxide,
4,4'-diamino-diphenyl N-methyl amine,
4,4'-diamino-diphenyl N-phenyl amine and mixtures thereof.

The tetracarboxylic acid dianhydrides are characterized by the following formula:

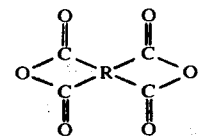

wherein R is a tetravalent organic radical containing at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

Illustrations of dianhydrides suitable for use in the present invention include:
pyromellitic dianhydride,
2,3,6,7-naphthalene tetracarblxylic dianhydride,
3,3'4,4'-diphenyl tetracarboxylic dianhydride,
1,2,5,6-naphthalene tetracarboxylic dianhydride,
2,2'3,3'-diphenyl tetracarboxylic dianhydride,
2,2-bis(3,4-dicarboxyphenyl) propane dianhydride,
bis(3,4-dicarboxyphenyl) sulfone dianhydride,
perylene 3,4,9,10-tetracarboxylic acid dianhydride,
bis(3,4-dicarboxyphenyl) ether dianhydride,
naphthalene-1,2,4,5-tetracarboxylic dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
bis(2,3-dicarboxyphenyl) methane dianhydride,
bis(4,5-dicarboxyphenyl) methane dianhydride,
benzene -1,2,3,4-tetracarboxylic dianhydride,
pyrazine-2,3,5,6-tetracarboxylic dianhydride,
thiophene-2,3,4,5-tetracarboxylic dianhydride,
3,4,3',4'-benzophenone tetracarboxylic dianhydride,
etc.

The solvents useful in the solution polymerization process for synthesizing the intermediate polyamide-acid compositions in the preferred process of preparing the polyimides are the organic solvents whose functional groups do not react with either of the reactants (the diamines or the dianhydrides) to any appreciable extent. Besides being inert to the system and preferably, being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydride groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are:

N,N-diethylformamide,
N,N-diethylacetamide,
N,N-dimethylmethoxy acetamide, N-methyl caprolactam, etc.

Other solvents which may be used in the present invention are:

dimethylsulfoxide,
N-methyl-2-pyrrolidone,
tetramethylene urea,
pyridine,
dimethylsulfone,
hexamethylphosphoramide,
tetramethylene sulfone,
formamide,
N-methylformamide,
butyrolacetone and
N-acetyl-2-pyrrolidone.

The solvents can be used alone, in combinations of solvents, or in combination with poor solvents such as benzene, benzonitrile, dioxane, xylene, toluene and cyclohexane.

By "polyimide film" is meant a layer of polyimide, as previously described, or polyimide that contains reinforcing and/or filler material such as natural or synthetic fibers such as fiberglas, boron, polyester, polyamide, acrylic, etc.; woven or non-woven fabrics made from natural or synthetic fibers such as any of the foregoing; particles such as silica, silicates, carbon black, carbonates, metals, metal oxides, such as magnesium oxide, calcium oxide, aluminum oxides, etc.; and fire retardant materials, such as antimony oxides and/or brominated or chlorinated phosphates, for example, tris-(2,3-dibiomopropyl)phosphate.

The acrylic adhesive composition can be applied to the polyimide film by conventional application procedures such as spraying, dipping, brushing, roll coating, and the like.

This acrylic adhesive composition should be a terpolymer of 15–65% by weight of the terpolymer of acrylonitrile, methacrylonitrile or mixtures thereof, 30–84% by weight of the terpolymer butyl acrylate, ethyl acrylate, 2-ethylhexyl acrylate, lauryl acrylate or mixtures thereof, and 1–15% by weight of the terpolymer of methacrylic acid, acrylic acid, itaconic acid or mixtures thereof. Also included should be a cross-linking resin such as melamine formaldehyde, phenol formaldehyde, or melamines such as hexamethoxymethyl melamine and the like. These cross-linkers can be present in an amount of about 1–10% by weight of terpolymer. A preferred adhesive composition uses a copolymer of acrylonitrile/butyl acrylate/methacrylic acid in about a 35/60/5 ratio by weight mixed with 5% phenol formaldehyde by weight based on the weight of the terpolymer.

The acrylic adhesive composition can be made by known addition polymerization techniques, such as those disclosed in Sanderson U.S. Pat. No. 3,032,521, issued May 1, 1962, the disclosure of which is hereby incorporated by reference.

Preferably, the acrylic adhesive compositions are contained in a dispersion in water. If desired, such aqueous dispersions can contain thickeners, such as polyacrylate thickeners. A suitable thickener is Acrysol ASE-60 polyacrylate thickener available from Rohm and Haas Company. However, if desired, the acrylic adhesive can be contained in a dispersion or solution in suitable organic liquid or mixtures of organic liquids, for example, aromatic hydrocarbons such as toluene, xylene, etc.; aliphatic hydrocarbons such as hexane, octane, etc.; esters such as ethyl acetate, etc.; ketones such as methyl ethyl ketone and methylisobutyl ketone; and ethers such as monoethers of ethylene glycol. Examples of suitable organic liquids are disclosed in U.S. Pat. No. 3,032,521.

If desired, the acrylic adhesive can contain reinforcing and/or extender material such as those previously enumerated as being suitable for the polyimide film.

The acrylic adhesive can be applied to the polyimide film in varying thickness depending on the desired end use. Greater thickness can be achieved by a plurality of coats. Ordinarily, the acrylic adhesive will have a thickness of at least 0.1 mil and at the present time, no need is seen to have a thickness of greater than about 20 mils. A preferred thickness is 0.1–10 mils and an especially preferred thickness is about 0.5–3 mils.

The acrylic adhesive coated polyimide films can be adhered to suitable substrates to form laminates. Suitable substrates include metal and especially metal foils of copper, copper alloys, aluminum, aluminum alloys, nickel, nickel alloys, silver, silver alloys, gold, gold alloys, iron, iron alloys; woven and non-woven fabrics made from nautral or synthetic fibers such as glass, boron, polyester, polyamide, acrylic, etc.; woven and non-woven fabric impregnated with resin such as polyimide, polyamide, epoxy, acrylic; paper of natural or synthetic fibers such as Nomex nylon paper, etc.; and film of polymer such as polyimide, polyamide, polyester, acrylic, epoxy, polyurethane, etc. Preferred substrates include metal and especially copper, polyimide film, polyamide paper, woven and non-woven glass fabric, and polyimide or epoxy impregnated glass fabric.

Standard lamination procedures can be used to make the laminates such as vacuum bag lamination, press lamination, roll lamination, etc. The laminates are useful as circuit boards, structural members and the like.

It has been observed that stronger bonds may be developed between the acrylic adhesive and the polyimide film when the polyimide film has a thickness of 2 mils or greater. However, acceptable adherence, for some utilities, is still obtained when the polyimide film has a thickness of less than 2 mils.

The following Examples illustrate the invention.

EXAMPLE 1

1. A 2 mil polyimide film which is the reaction product of oxydianiline and pyromellitic dianhydride was coated on one side with a 35% by weight dispersion in water of an acrylic adhesive composition. The acrylic adhesive is a mixture of a terpolymer and cross-linking resin. The terpolymer is the reaction product of 35 weight per cent acrylonitrile, 60 weight per cent butyl acrylate and 5 weight per cent methacrylic acid. The cross-linking resin is phenol formaldehyde resin and is present in an amount of 5% by weight, based on the total weight of the terpolymer.

2. A number 30 wire wound rod was drawn down the acrylic adhesive composition to remove excess quantities. The film was then dried at about 240°F. for about 10 minutes. The dried acrylic adhesive had a thickness of about 0.7 mil.

3. The coated side of the polyimide film was then laminated to a foil of 1 ounce copper (that is, 1 ounce per square foot), having "Treatment A" (available from Circuit Foil, Inc.) by applying a temperature of 400°F. and a pressure of about 400 pounds per square inch for 15 minutes.

The resulting laminate is useful as a circuit board. The copper was found to have excellent adhesion to the polyimide film.

EXAMPLE 2

1. Using the procedure of Example 1, the acrylic adhesive of Example 1 was coated on both sides of a polyimide impregnated glass fabric. The polyimide is the reaction product of benzophenone tetracarboxylic acid dianhydride and methyl dianiline.

2. One ounce copper foil, having "Treatment A", was then laminated to both sides of the material of (1) using two steps. Step one subjected the laminate to a pressure of 200 pounds per square inch and a temperature of 280°F. for about 10 minutes. Step 2 subjected the laminate to a pressure of 200 pounds per square inch and a temperature of 400°F. for about 10 minutes.

The resulting laminate was found to have excellent adhesion.

The invention claimed is:

1. An acrylic adhesive coated polyimide film, at least 2 mils in thickness said polyimide film having the recurring unit:

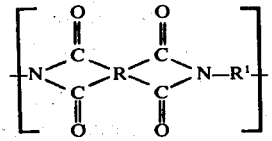

wherein R is a tetravalent radical containing at least one ring of six carbon atoms, said ring characterized by benzenoid unsaturation, the four carbonyl groups being attached directly to separate carbon atoms in the ring of the R radical and each pair of carbonyl groups being attached to adjacent carbon atoms in the ring of the R radical; and wherein $R^1$ is a divalent radical containing at least two rings of six carbon atoms, each ring characterized by benzenoid unsaturation, and in which no more than one of the valence bonds is located on any one of said rings of said $R^1$ radical;

said acrylic adhesive being a terpolymer having 15–65% by weight of the terpolymer of acrylonitrile, methacrylonitrile, or mixtures thereof, 30–84% by weight of the terpolymer of butyl acrylate, ethyl acrylate, 2-ethylhexyl acrylate, lauryl acrylate, or mixtures thereof, and 1–15% by weight of the terpolymer of methacrylic acid, acrylic acid, itaconic acid, or mixtures thereof, said acrylic adhesive also containing a cross-linking resin selected from the group consisting of phenol formaldehyde, melamine formaldehyde and hexamethoxymethyl melamine, said resin being present in an amount of about 1–10% by weight of the terpolymer.

2. The acrylic adhesive coated polyimide film of claim 1 wherein the polyimide film has the recurring unit:

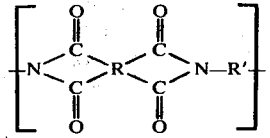

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein $R^1$ is a divalent benzenoid radical selected from the group consisting of

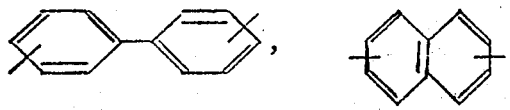

and

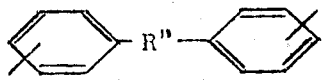

wherein R'' is selected from the group consisting of an alkylene chain having 1–3 carbon atoms,

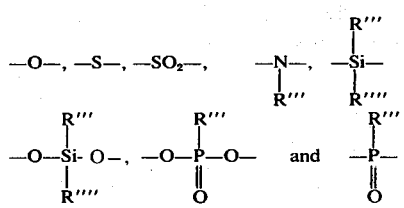

where R''' and R'''' are selected from the group consisting of alkyl and acryl, and wherein the acrylic adhesive is a terpolymer of acrylonitrile/butylacrylate/methacrylic acid in a 35/60/5 ratio by weight respectively, with 5% by weight of the terpolymer of the crosslinking resin.

3. The acrylic adhesive coated polyimide film of claim 1 wherein the polyimide film has the recurring unit:

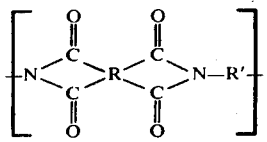

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R¹ is a divalent benzenoid radical selected from the group consisting of

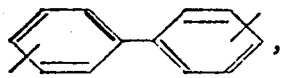 , 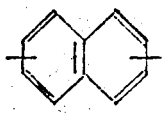

and

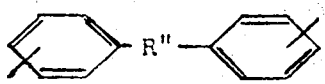

wherein R'' is selected from the group consisting of an alkylene chain having 1–3 carbon atoms.

4. The acrylic adhesive coated polyimide film of claim 1 wherein the polyimide film has the recurring unit:

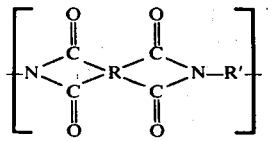

where R is a tetravalent aromatic radical, preferably containing at least one ring of six carbon atoms, said ring characterized by benzenoid unsaturation, the four carbonyl groups being attached directly to separate carbon atoms in a ring and each pair of carboxyl groups being attached to adjacent carbon atoms in a ring of the R radical; and wherein R¹ is a divalent benzenoid radical selected from the group consisting of

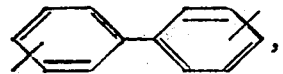 , 

and

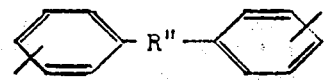

wherein R'' is selected from the group consisting of an alkylene chain having 1–3 carbon atoms,

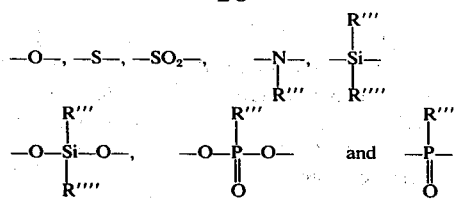

where R''' and R'''' are selected from the group consisting of alkyl and aryl, and wherein the acrylic adhesive is a terpolymer of acrylonitrile/ethyl acrylate/methacrylate acid in a 20/75/5 ratio by weight respectively, with 5% by weight of the terpolymer of the cross-linking resin.

5. The acrylic adhesive coated polyimide film of claim 1 wherein the polyimide film has the recurring unit:

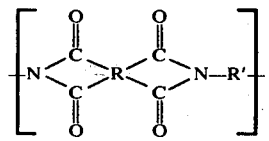

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of

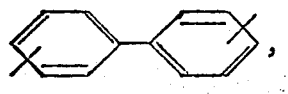 , 

and

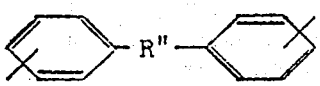

where R'' is selected from the group consisting of an alkylene chain having 1–3 carbon atoms,

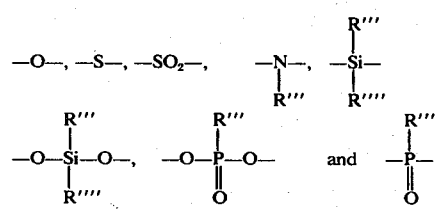

where R''' and R'''' are selected from the group consisting of alkyl and aryl, and wherein the acrylic adhesive is a terpolymer of acrylonitrile/ethyl acrylate/methacrylic acid in a 20/75/5 ratio by weight respectively, with 5% by weight of the terpolymer of the cross-linking resin.

6. The acrylic adhesive coated polyimide film of claim 2 wherein the polyimide film is a polyimide of an aromatic tetracarboxylic acid dianhydride wherein all four carboxyl groups of said dianhydride are directly attached to an aromatic ring of said dianhydride and an aromatic diamine having the formula $$NH_2 - R' - NH_2$$

wherein R' is a divalent benzenoid radical selected from the group consisting of

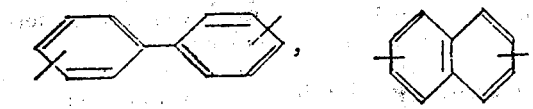

and

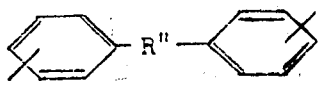

wherein R'' is selected from the group consisting of an alkylene chain having 1–3 carbon atoms,

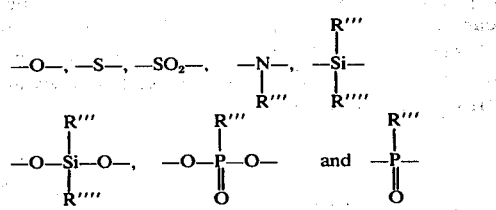

7. The acrylic adhesive coated polyimide film of claim 3 wherein the polyimide film is a polyimide of an aromatic tetracarboxylic acid dianhydride wherein all four carboxyl groups of said dianhydride are directly attached to an aromatic ring of said dianhydride and an aromatic diamine having the formula $$NH_2 - R' - NH_2$$

wherein R' is a divalent benzenoid radical selected from the group consisting of

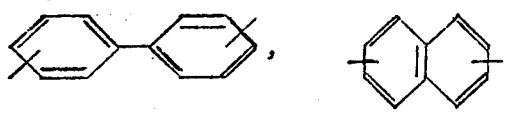

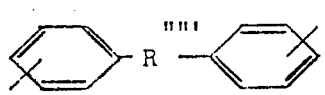

wherein R''''' is selected from the group consisting of an alkylene chain having 1–3 carbon atoms,

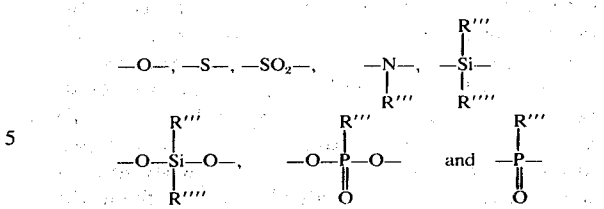

8. Laminate comprising the acrylic adhesive coated polyimide film of claim 1 adhered to at least one substrate selected from the group consisting of metal, woven or non-woven fabric or natural or synthetic fiber, woven or non-woven fabric or natural or synthetic fiber impregnated with polymer, paper of natural or synthetic fibers and film of polymer.

9. Laminate comprising the acrylic adhesive coated polyimide film of claim 2 adhered to at least one substrate selected from the group consisting of metal, woven or non-woven fabric of natural or synthetic fiber, woven or non-woven fabric of natural or synthetic fiber impregnated with polymer, paper of natural or synthetic fibers and film of polymer.

10. Laminate comprising the acrylic adhesive coated polyimide film of claim 3 adhered to at least one substrate selected from the group consisting of metal, woven or non-woven fabric of natural or synthetic fiber, woven or non-woven fabric or natural or synthetic fiber impregnated with polymer, paper of natural or synthetic fibers and film of polymer.

11. Laminate comprising the acrylic adhesive coated polyimide film of claim 4 adhered to at least one substrate selected from the group consisting of metal, woven or non-woven fabric of natural or synthetic fiber, woven or non-woven fabric or natural or synthetic fiber impregnated with polymer, paper of natural or synthetic fibers and film of polymer.

12. Laminate comprising the acrylic adhesive coated polyimide film of claim 5 adhered to at least one substrate selected from the group consisting of metal, woven or non-woven fabric or natural or synthetic fiber, woven or non-woven fabric of natural or synthetic fiber impregnated with polymer, paper of natural or synthetic fibers and films of polymer.

13. Laminate comprising the acrylic adhesive coated polyimide film of claim 6 adhered to at least one substrate selected from the group consisting of metal, woven or non-woven fabric of natural or synthetic fiber, woven or non-woven fabric of natural or synthetic fiber impregnated with polymer, paper of natural or synthetic fibers and films of polymer.

14. Laminate comprising the acrylic adhesive coated polyimide film of claim 7 adhered to at least one substrate selected from the group consisting of metal, woven or non-woven fabric of natural or synthetic fiber, woven or non-woven fabric of natural or synthetic fiber impregnated with polymer, paper of natural or synthetic fibers fiber impregnated with polymer, paper of natural or synthetic fibers and film of polymer.

15. Laminate comprising the acrylic adhesive coated polyimide film of claim 1 adhered to at least one substrate selected from the group consisting of metal, polyimide film, woven or non-woven glass fabric, woven or non-woven glass fabric impregnated with polymer selected from the group consisting of polyimide and polyamide and polyamide paper.

* * * * *